UNITED STATES PATENT OFFICE.

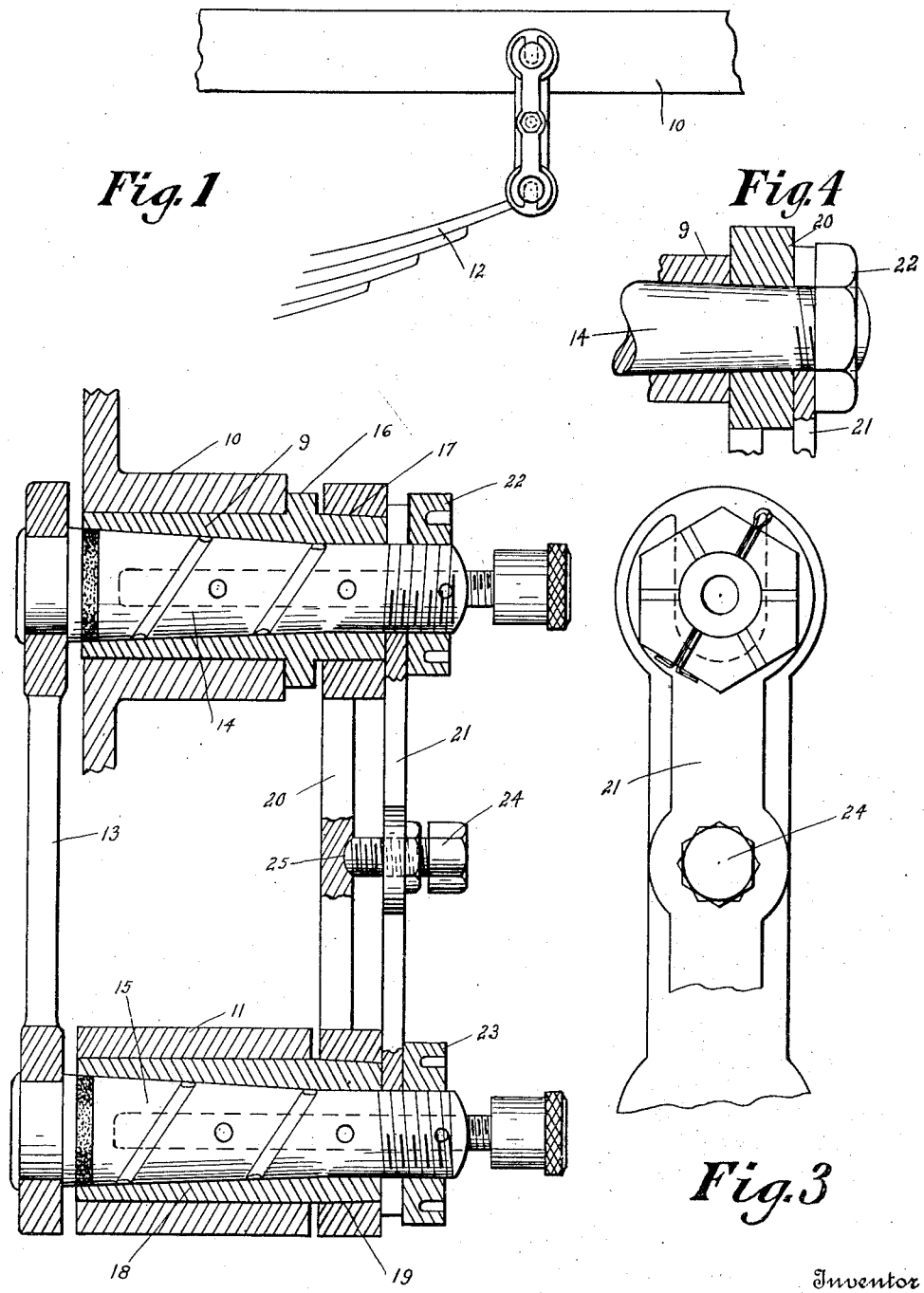

WILLIAM A. TRYON, OF PROVIDENCE, RHODE ISLAND.

SHACKLE.

1,367,760.  Specification of Letters Patent.  Patented Feb. 8, 1921.

Application filed October 1, 1919, Serial No. 327,769. Renewed December 16, 1920. Serial No. 431,278.

*To all whom it may concern:*

Be it known that I, WILLIAM A. TRYON, a citizen of the United States, and resident of the city of Providence, in the county of Providence and State of Rhode Island, have invented certain new and useful Improvements in Shackles, of which the following is a specification.

This invention relates to improvements in shackles more particularly adapted for connecting vehicle springs to the chassis thereof; and the object of this invention is to provide means for automatically taking up the wear of the moving parts and preventing the same from rattling.

With these and other objects in view, the invention consists of certain novel features of construction, as will be more fully described, and particularly pointed out in the appended claims.

In the accompanying drawings:

Figure 1— is a side elevation illustrating a portion of the vehicle spring and my improved shackle connecting the same to the chassis of the vehicle.

Fig. 2— is a sectional side elevation illustrating the general construction of my improved shackle.

Fig. 3— is an edge view showing a portion of the shackle.

Fig. 4— is a modified construction showing the end of the adjustable shackle-link mounted directly on the tapered end of the stud.

Referring to the drawings, 10 designates the frame portion of a vehicle chassis, which is constructed to serve as a bearing through which one of the supporting members of the shackle is passed, and 11 designates the eye-portion of the spring 12 to which the other end of the shackle is connected.

My improved shackle consists essentially of two links connected together by studs or bolts. To the inner face of one link 13 is secured two tapered studs or bolts 14 and 15 respectively, whose axes are parallel and at right angles to the plane of this link. These studs or bolts may be riveted or otherwise permanently secured to this link 13. Mounted on the stud 14 is a bushing or sleeve 9 whose bore is tapered to fit that of the stud and whose outer surface is designed to be forced or otherwise fixed and secured to the member 10 of the chassis. This bushing is provided with a collar 16 and its outer end 17 is tapered.

The lower stud 15 is also provided with a bushing 18 the bore of which like the upper bushing is designed to fit the tapered portion of the stud 15, its outer surface being designed to be forced or otherwise fixed into the eye 11 of the spring. The outer end 19 of this bushing is also tapered. 20 designates the outer or adjustable shackle link which is designed to engage the tapered ends 17 and 19 of the bushings 15 and 18 and to rotate thereon as the shackle swings back and forth with the action of the spring.

In order to exert a slight wear take up tension on the parts, I have provided a spring plate 21 which is preferably forked at its opposite ends to fit over the ends of the studs 14 and 15, and all of the parts on each stud are secured in position by the nuts 22 and 23 respectively. In order to apply a tension to take up the wear of the moving parts on each stud, I have provided a spring plate 21 through which the tension bolt 24 is threaded, the inner end of this bolt being positioned to engage a recess 25 formed in the shackle link 20.

By the use of my improved shackle, the wear on all of the tapered parts may be taken up automatically by simply adjusting the screw 24 to exert a slight tension on the plate 21, the forked end of which engaging the nuts 22 and 23 have a tendency to draw the stud outward while pressure in the opposite direction is exerted through the link 20 forcing them onto the tapered ends 17 and 19 of the bushings 9 and 18 which in time serves to draw the tapered portions of the stud inward into their respective bushings. In this way it will be seen that the wear is constantly being taken up as fast as it occurs thereby positively preventing rattling of the parts.

I have described the adjusting link as mounted on the tapered ends of the bushings, but the tapered portion of these bushings may be moved and the link mounted directly on the tapered portions of the studs if desired, as illustrated in Fig. 4.

The device is very practical in construction and efficient in its action.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. In a spring shackle for vehicles, a pair of spaced apart tapering bearing studs, a pair of shackle links each connecting corresponding ends of said studs, bushings adapted to be fixed in the chassis parts and having tapered holes in which said studs are adapted to rotate, one of said links being adjustably mounted on said bushings, and spring means acting between said studs and bushings to automatically take up wear on said tapered surfaces.

2. In a spring shackle for vehicles, a pair of spaced apart tapering bearing studs, a pair of shackle links each connecting corresponding ends of said studs, bushings tapered at their ends on their outer surfaces and adapted to be fixed in the chassis parts of a vehicle and having tapering holes in which said studs are adapted to rotate, one of said links being adjustable and rotatably mounted on the tapered end of said bushings, and spring means acting to take up the wear on said tapered surfaces.

3. A spring shackle for vehicles comprising a pair of spaced apart bearing studs, a pair of spaced apart parallel shackle links one fixed to said studs and the other adjustable laterally relative thereto, bushings tapered on their ends and adapted to be fixed in the chassis parts of a vehicle and having tapering holes in which said studs are rotatably mounted, said adjustable links being rotatably mounted on the tapered end of said bushings, a spring plate acting between said studs and adjustable links to take up the wear on said tapered surfaces, and means acting upon said plate whereby its tension may be regulated.

In testimony whereof I affix my signature.

WILLIAM A. TRYON.